April 18, 1967
E. J. MAXION
3,314,813
PRINTABLE POLYOLEFIN COMPOSITIONS AND PRODUCTS
Filed Feb. 5, 1963
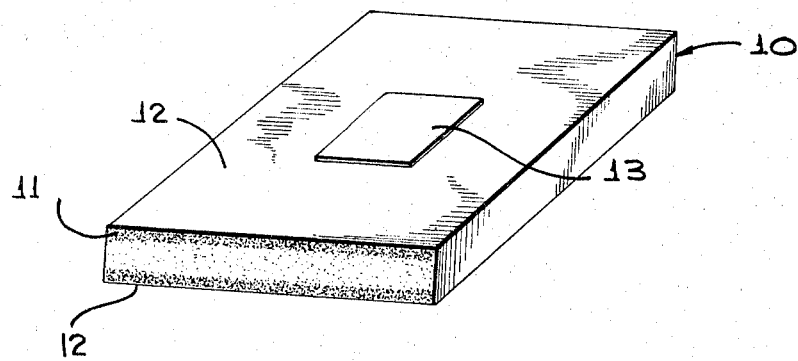
INVENTOR
EMIL J. MAXION
BY Mason, Porter, Niller & Stewart
ATTORNEYS

United States Patent Office 3,314,813
Patented Apr. 18, 1967

3,314,813
PRINTABLE POLYOLEFIN COMPOSITIONS AND PRODUCTS
Emil J. Maxion, Park Forest, Ill., assignor to Continental Can Company, Inc., New York, N.Y., a corporation of New York
Filed Feb. 5, 1963, Ser. No. 256,298
9 Claims. (Cl. 117—12)

This invention relates generally to polyolefin materials and more specifically to polyolefin materials having surfaces to which conventional inks and coatings will adhere without resorting to a pretreatment of such polyolefin surfaces to render them adherent to conventional inks and coatings.

Untreated polyethylene, polypropylene, copolymers of ethylene or propylene with isobutylene, isoprene and other olefinic monomers, and like non-polar polyhydrocarbons, because of their smooth wax-like surface properties, will not permit conventional dried ink coatings to adhere thereto. The standard type inks, e.g. gravure, silk screen, flexographic and dry offset inks, when applied to untreated polyolefin surfaces and substantially dried in accordance with the normal schedule for any particular ink or coating, are removed easily therefrom by a slight scraping action or by pressure-sensitive tape application and removal. These polyolefin materials are otherwise excellently suited as wrapping, packaging or container materials; however, their use in this field has been restricted since conventional inks and coatings do not satisfactorily adhere to their surfaces. The usefulness as well as the appearance of polyolefin articles is greatly diminished if indicia such as trademarks, recipes and advertising material originally imprinted thereon are partially or entirely removed therefrom by the incidents of normal handling of the products. It is a basic essential that inks and coatings must satisfactorily adhere to such polyolefin surfaces if these materials are to be utilized to their fullest extent.

In recent years, much has been done in the field of treating polyolefinic materials such as polyethylene sheet or film so that conventional inks and coatings will adhere thereto. These efforts have been primarily restricted to surface treatment procedures for rendering the surface of an already formed polyolefin article receptive to conventional inks and coatings. One such procedure involves the application of an oxidizing solution composed of sodium dichromate and sulfuric acid to the surface of the polyolefin article, to render the surface hydrophilic and receptive to printing and stenciling inks. Other known processes for rendering polyolefinic surfaces adherent to inks and coatings include flame treatment, heat treatment and electronic treatment. The standard gravure, silk screen, flexographic and dry offset inks, when applied and dried upon such treated polyolefin surfaces, satisfactorily adhere thereto.

Although all of the above treatments, as well as various others which have been proposed, have been effective to some degree in making the surface of polyolefinic materials receptive to inks and coatings, the use of any treatment which involves separate conditioning of the polyolefin surface, prior to its receipt of an ink or coating, increases the complexity and the cost of manufacturing such materials, and thereby restricts their usability for low cost packaging and the like. Furthermore, such treatments generally involve extensive and often costly apparatus which in turn demands valuable plant space and requires additional labor for its maintenance. Additionally, these treatments tend to change the properties of these polyolefinic materials thereby making those materials more reactive with alkalies and acids, as well as weakening the structure of the polyolefin material itself. A heavy treatment effect upon the surface of the polyolefin is necessary for commercially acceptable ink-adherent material: and the corona or flame treatment of linear polyethylene and polypropylene must often be repeated to attain a satisfactory surface condition, with the accompanying weakening of the material.

These treatments are in common use regardless of their drawbacks, even to the extent that when an ink or coating is mentioned as being adherent to a polyolefin surface such as polyethylene, it is generally understood that the use of treated polyethylene is intended. In fact, the general terminology in this field does not usually designate that the polyolefin surface has been treated prior to its receipt of an ink or coating.

Work has also been carried out in conjunction with the inks and coatings generally utilized in the conventional printing procedures such as gravure, silk screen, flexographic and dry offset, in an attempt to render such inks and coatings adherent to untreated polyolefin surfaces by modification thereof of such inks. Such an approach has not reached the state of commercial acceptance accorded the aforesaid surface treatment procedures, mainly because the inks and coatings are generally compounded for ease in application by their requisite process of application. In fact, the specific ink or coating used to print commercially treated polyethylene sheets, films, bottles, etc., is more apt to be one selected for the application process rather than an ink or coating especially designed for polyethylene. Thus, the same ink is often used to print treated polyethylene, polyvinylidene chloride, cellophane and even metal foil surfaces by a particular application process, because the ink so selected is prepared to be especially adapted for such a particular application process. Therefore, certain inks and coatings have generally become closely associated with particular application processes, e.g., "Vics Red Silk Screen Ink" or "White Gravure Check Ink L-2268." The modification of these standard commercial inks so as to be adherent to untreated polyolefin surfaces has in some cases reduced their effectiveness in the particular mode or process of application. Therefore this approach poses problems from a commercial standpoint, although having many advantages over the processes involving surface treatment of already formed polyolefin articles.

It is highly desirable to provide a way by which polyolefin articles can be modified so as to render their surfaces receptive to standard commercially used inks and coatings without resorting to the previously referred to surface treatments or use of modified inks.

The present invention relates to such a procedure of modifying the composition of polyolefin material prior to its formation into sheets, films, containers, etc. The surfaces of these modified polyolefin compositions are receptive to standard dried inks and coatings without further treatment.

It is an object of the invention to provide polyolefin compositions, the untreated surfaces of which are adherently receptive to standard dried inks and coatings.

Another object of the invention is the provision of a method of providing untreated polyolefin surfaces which are receptively adherent to standard dried inks or coatings, by modifying polyolefin compositions by the addition thereto of drying oil during the blending of such polyolefin compositions.

A further object of the invention is the provision of a composition of matter comprising a blend of polyolefin material with a drying oil, which composition exhibits adhesion with standard dried inks and coatings without the need of a pretreatment of the surface thereof.

A still further object of the invention is to provide a composition of matter comprising a blend of a polyolefin material with a drying oil, which drying oil has a substantial portion of its component fatty acid present in polyunsaturated form.

Also an object of the invention is the provision of a polyolefin composition of matter comprising a blend of a polyolefin material with a drying oil having a substantial portion of polyunsaturated fatty acids and which exhibits a concentration gradient of said drying oil component from the surface of an article formed from such composition which is receptive to standard dried inks and coatings.

With the above and other objects in view, as will appear hereinafter, the nature of the invention will be more clearly understood by reference to the following detailed description of embodiments thereof.

It has been found that articles made from a blend of a polyolefin material with a small proportion of a drying oil will exhibit satisfactory adhesion with standard dried inks and coatings without a surface treatment thereof such as the aforesaid conventionally utilized flame, heat, or electronic treatments. Natural drying oils consist generally of certain fatty oils which have the ability when exposed to oxidizing conditions to form dry, tough, and durable films and because of their particular characteristics have long been employed in the paint and varnish industries.

Such oils are sometimes classified as "drying oils," when the content of unsaturated acids is 70 percent or more, and "semi-drying oils" where the content of unsaturated acids is less. Intrade, the phrase "drying oils" is frequently employed for the oils which have unsaturated acid therein and exhibit the ability to react with oxygen or to polymerize. Many of these oils, particularly the semi-drying oils, dry slowly, and consequently there have been developed commercially acceptable catalysts to hasten such drying, among which are the soluble cobalt, manganese, and lead salts of linoleic, resin or naphthenic acids.

A main characteristic of drying oils is a content of unsaturated fatty acids. Such drying oils include triglyceride esters of unsaturated fatty acids: e.g., in vegetable and animal oils doubly or triply unsauturated fatty acids constitute a substantial part of the total fatty acid content of the ester.

Table I shows the fatty acid composition of several drying and semi-drying oils, the values being those stated in "Vegetable Fats and Oils" by E. W. Eckley (Reinhold Publishing Corporation, 1954), e.g., at page 36, and as noted for oiticica oil at page 466 thereof. "D.C.O." is an accepted abbreviation for dehydrated castor oil.

TABLE I.—FATTY ACID COMPOSITION OF OILS
[Percentage of polyunsaturated acids]

| | |
|---|---|
| Tung | 90.5 |
| Oiticica | 82.4 |
| Dehydrated castor | 90.0 |
| Safflower | 76.6–79.1 |
| Soya | 57.2 |
| Linseed | 71.0 |
| Perilla | 77.8–93.4 |
| Cottonseed | 44.9 |
| Sunflower | 44.2–75.4 |
| Walnut | 57.7–76.7 |
| Hempseed | 77.3 |
| Poppyseed | 62.2 |
| Beechnut | 36–45 |
| Corn | 34–64.9 |
| Pumpkin seed | 46–47 |
| Sesame | 40.4–48.4 |
| Candlenut | 77 |
| Chia | 87.0 |
| Tall oil esters of glycerine | 54–66.3 |

It has been found that a "drying" or "semi-drying" oil is effective for rendering the surface of a polyolefin composition of the instant type receptive to inks and like coatings, when the polyunsautrated fatty acid content of the oil is at least 40 percent by weight of the total fatty acid content. Thus, while beechnut and corn oils are usable which have at least 40 percent of the fatty acid content of the polyunsaturated type, such oils with a lower content of polyunsaturated acids should not be used.

As many of the naturally occurring drying oils are imported, much work has been done in recent years to develop synthetic drying oils and substitutes therefor, which synthetics and substitutes have equally desirable effects upon the polyolefin compositions of the present invention. Examples of such modified or synthetic oils which produce satisfactory drying effects are 10, 12, 14-octadecatrienoic acid glyceride, dehydrated castor oil, and the reconstructed oils prepared by the esterification of polyunsaturated acids with polyhydric alcohols other than glycerol. Other synthetic or rearranged oils which satisfactorily act as drying oils for the instant purpose are the "long oil" alkyds and the oleoresinous varnishes. Copolymer oils prepared from diolefinic hydrocarbons, much as cyclopentadiene, butadiene and isoprene also act as drying oils. These copolymer oils, as well as the ester drying oils, are often interacted with minor amounts of maleic anhydride and are useful drying materials.

The final surface of the blend, ready for the application of ink thereto, comprises oxidized and/or polymerized oil components: and prior polymerizing or oxidizing may be employed to facilitate rapid oxidation-polymerization action. Thus, these oils may be employed in bodied or blown form; or they may be saponified and re-esterified, after or without refining, to form esters of glycols, glycerol, pentaerythritol, trimethylol ethane, trimethylol propane, sorbitol, tetramethylol cyclohexanol and other polyhydric alcohols. Broadly they may be defined as the esters of polyhydric alcohols and aliphatic acids in which at least 40 percent by weight of such acids in the oil are of polyunsaturated form. Mixtures of such oils can be employed.

The following examples are illustrative of the invention with parts indicated by weight unless otherwise noted:

*Example 1*

Fifteen hundred grams of a linear polyethylene copolymer containing a minor amount of 1-butene and having a density of 0.950, a melt index of 0.3 and commercially obtainable as "Marlex 5003" were placed in a heated commercial Banbury mixer and masticated until the temperature reached 230 degrees F. Ninety grams of raw tung oil were then added slowly over a 10 minute period, whereupon the heating was stopped and the mixing continued until a temperature rise to 250°–300° F. was observed. The blend was then mixed an additional 15 seconds at high speed to assure homogeneity. The blend was removed from the Banbury mixer, placed in a rubber mill, sheeted out, and cooled. The resulting sheet was granulated and mixed in a tumble blender with pellets of the same but unmodified polyethylene in the proportion of 100 parts of the polyethylene-oil blend to 189 parts of unmodified polyethylene. This granular mixture was then immediately placed in a standard 1½ inch polyethylene extruder, heated and extruded to form a 10 mil film, with extruder barrel and die temperatures of 375 and 355 degrees F., respectively. Specimens were then caused to dry, that is, the oil component was oxidized and/or polymerized at the surface, until no longer tacky. The time and temperature for the drying process are inversely interrelated. Thus, the material of this Example 1 attains commercially useful adhesion properties by heating for ten minutes in air at 195 degrees F. or by standing at room temperature in air for thirty-six hours. "Excellent" adhesion was attained in air in twenty minutes at 195 degrees F. or in forty-eight hours at room temperature.

Various inks, conventionally used for printing flame or corona treated polyethylene film were then applied to the extruded and dried film specimens; and the ink adhesion was evaluated by the standard pressure sensitive tape test.

The pressure sensitive tape test is a standard means of evaluating ink and coating adhesion in the industry. Briefly described, the test involves applying pressure sensitive tape to a coating, smoothing the tape thereupon and jerking the tape from the coating at a rate of approximately 1 foot per second while maintaining the tape close to the coated specimen at an angle of approximately 180 degrees from the starting point. A visual estimate is then made of the percentage of coating originally in contact with the tape but not taken up thereon and a rating of excellent, very good, good, moderate, fair, poor, or none is given to the sample thus evaluated. A rating of "excellent" indicates 100 percent adhesion while the other ratings represent values of lesser percentages of adhesion. For general commercial employment, the rating should be "moderate" or better.

When the specimens had been treated in air for 30 minutes at 195 degrees F. before ink application, "Excellent" adhesion was attained with (a) rotogravure ink application which had been force-dried in a circulating air oven for 2 minutes at 160° F.; and with (b) a dry offset process ink application, as conventionally applied to polyethylene bottles and available commercially under the mark "Lux D.O.," which had been force-dried in a circulating air oven for 8 minutes at 195° F.

Specimens which had been treated in air for 24 hours at 195° F. before the ink application, showed "Excellent" results with (c) an ink based on nitrocellulose and conventionally applied to treated polyethylene film by the flexographic process and commercially available under the mark "NOX 301076," and with (d) an ink as conventionally applied to treated polyethylene film by the silk screen process and commercially available under the mark "Vics Red." In each case, the ink was force-dried in a circulating air oven for 8 minutes at 195° F.

The ink (a) above can be compounded from:

| | Parts by weight |
|---|---|
| Dispersion A | 100 |
| Solution B | 80 |
| Solution C | 15 |

Wherein Dispersion A consists of:

| | Parts by weight |
|---|---|
| Titanium dioxide | 55 |
| Nitrocellulose (1/4 sec. RS) | 10.9 |
| Dibutyl phthalate | 7.4 |
| Ethyl acetate | 12.9 |
| Toluol | 13.8 |

The solution B consists of:

| | Parts by weight |
|---|---|
| Acid: amine polymer | 30 |
| Toluol | 49 |
| Isopropyl alcohol | 21 |

The solution C consists of:

| | Parts by weight |
|---|---|
| Nitrocellulose | 38.2 |
| Ethyl alcohol | 18.1 |
| Toluol | 18.1 |
| Ethyl acetate | 16.2 |
| Low boiling petroleum naphtha | 6.4 |
| Acetone | 3.0 |

The acid: amine polymer for Solution B was a polycondensation product of dimer acids and diamines: the material commercially available by the name "Versamid 930" has been used: other polyesters of polybasic acids and diamines can be used. Regular soluble ("RS") nitrocellulose is distinguished from the spirit (alcohol) soluble type "SS." The nitrocellulose employed in the preparation of solution C, above, contained 11.8–12.2 percent of nitrogen and is commercially available under the mark "RS 1/2 sec." of the Hercules Powder Company.

Example 2

Two hundred grams of low density polyethylene was melted and banded on a standard rubber mill at 300 degree F. for about 5 minutes. Twenty-two and two-tenths grams of raw tung oil were added slowly, in order avoid breaking the band, and the milling continued for about 5 minutes so as to obtain homogeneity of the blend. The blend was then melt extruded to a film 3 to 8 mils in thickness. The resultant film was exposed to forced circulated air at 160 degrees for 13 hours and then cooled. The surface was non-oily and non-tacky. A commercial gravure ink was applied to the surface. The ink coating was air dried for about 1 hour and the adhesion found to be very good by the standard pressure sensitive tape test.

The polyethylene employed was a low density branched coating grade commercially obtainable as "Tenite 859." The ink employed was that set out as ink (a) for Example 1.

Examples 3–9

The procedure as set out in Example 2 was followed except that variations in proportions were made as indicated. The results are set forth in Table II.

TABLE II.—INK ADHESION TO POLYOLEFIN TUNG OIL BLENDS

| Ex. | Percent Raw Tung Oil | Film Drying Conditions | Adhesion |
|---|---|---|---|
| 3 | 0.0 | 15 hours at 160° F | None. |
| 4 | 3.0 | ----do---- | Good. |
| 5 | 1.0 | ----do---- | Do. |
| 6 | 0.3 | ----do---- | Do. |
| 7 | 0.05 | ----do---- | Moderate. |
| 8 | 10.0 | 1 week at room temperature | Poor. |
| 9 | 3.0 | 15 hours at room temperature | Good. Do. |

Example 10

Example 4 was repeated with the exception that a raw tung oil containing 0.3% cobalt by weight (added in the form of a 6% cobalt naphthenate solution) was employed in forming the blend. The film was then heated for 12 hours at 160 degrees F. and the adhesion of the standard gravure ink (a), above, was evaluated by the pressure sensitive tape test and found to be slightly better than that obtained in Example 4.

Examples 11–13

The same general procedure was utilized as in Example 2, with 2 percent by weight of raw tung oil being employed with the same low density polyethylene, a metallic drier being added in the proportions shown in Table III, and with milling for 5 minutes at a temperature of 340 degrees F. The adhesion toward the standard gravure ink (a) was evaluated by the standard pressure sensitive tape test. The results are tabulated.

TABLE III.—INK ADHESION TO POLYOLEFIN TUNG OIL DRIER BLENDS

| Ex. | Percent Tung Oil | Drier | Film Drying Conditions | Adhesion |
|---|---|---|---|---|
| 11 | 2.0 | 0.1 | 30 minutes at 195° F | Good. |
| 12 | 2.0 | 0.02 | 15 minutes at 195° F | Do. |
| 13 | 2.0 | 0.02 | 60 hours at room temperature | Do. |

The drier employed was cobalt naphthenate, and is stated as the percent of cobalt, based on the weight of tung oil.

Amounts of metallic driers of from 0.001 to 2.0% by weight of the blend, or from 0.005 to 5% by weight of the drying oil, expressed as the metal content of the drier salt, are usable. Thus the higher amounts of drier (e.g., above 0.03% metal based on the blend) may be used, but this must be done with caution and in light of the expected use, since such large additions can cause the blend, on prolonged aging, to lose tensile strength, presumably due to accelerated degradation of the polyolefin by oxidation. The polyethylene-oil blend may be coated, for example, by the extrusion process, on a substrate. Such a structure, in the form of a package, has the advantage that the exposed surface of the protective layer of the blend is competent to receive price markings as often applied by the retailer.

A notable behavior of instant material is that it may be employed as a lamination with paper to procure improved bonding over that of a film of unblended and untreated polyethylene, with or without prior printing upon the paper substrate: and with the further advantage that the exposed surface of the protective layer of the blend is competent to receive price markings as often applied by the retailer to the package.

*Example 14*

Fifteen hundred grams of low density polyethylene were placed in a commercial Banbury mixer and masticated until the temperature reached 230 degrees F. Ninety grams of raw tung oil were then added slowly over a 10 minute period, where upon the heating was stopped and the mixing continued until a temperature rise to 250°–300° F. was observed. The blend was then mixed an additional 15 seconds at high speed to assure homogenity. The blend was then removed, placed on a rubber mill, sheeted out and cooled. The resulting sheet was granulated and mixed in a tumble blender with unmodified pellets of the same polyethylene in the proportion of 100 parts polyethylene-oil blend to 189 parts virgin polyethylene. This material was then imemdiately extruded from a standard 1½ inch polyethylene extruder to form a 10 mil film at extruder barrel and die temperatures of 375 and 355 degrees F., respectively.

The polyethylene was a low density branched film grade commercially obtainable as "Alathon 10."

Various inks, conventionally used for printing treated polyethylene film, were then applied to the film specimens; and the adhesion of the ink was evaluated by the standard pressure sensitive tape test. The results are set out as Examples 14–A and 14–B in Table IV:

TABLE IV.—INK ADHESION TO POLYOLEFIN-TUNG OIL BLENDS

| Ex. | Film Drying Conditions | Ink Adhesion | | | |
|---|---|---|---|---|---|
| | | (a) | (b) | (c) | (d) |
| 14–A | 24 hours at 195° F | E | E | E | |
| 14–B | 6 weeks at 72° F | E | | E | E |

E = Excellent.

*Examples 15 and 16*

For purposes of comparison, Examples 1 and 14 were repeated except that the tung oil was left out of the polyolefin composition. Samples of the resultant film, processed under the same conditions utilized to produce Examples 1 and 14, were subjected either to air at a temperature of 195 degrees F. for 30 minutes or to air at room temperature for 3½ months. The thus treated films were coated with the inks as in Examples 1 and 14, but no ink adhesion was observed by the standard pressure sensitive tape test.

Therefore, as shown in Examples 15 and 16, the heating employed to dry conventional inks or to develop an adhesive surface on polyolefin compositions containing drying oils, did not cause these inks to adhere to the non-modified polyolefins. As an illustration of the drastic conditions required to obtain an adhesive polyethylene surface by heating in air, it was found necessary to maintain polyethylene at a minimum heating schedule of 475 degrees F. in air for 2½ seconds. Heating at 550 degrees F. in a nitrogen atmosphere for 2 seconds failed to yield an adhesive surface.

The drawing shows in perspective a piece of film 10 made by extruding the instant composition, with the thickness greatly exaggerated, noting that such extruded films may be a thousandth of an inch thick. The end has been stippled to show that the proportion of oil increases in the surface region 11, so a high ratio of dried oil is presented at the surface 12 to receive the ink composition 13.

Analysis, by infra-red absorption spectroscopy, of the surface of several 10 mil films composed of an adherent composition containing 2 parts of tung oil and 100 parts of the polyethylene of Example 1 showed that a higher concentration of the modifying drying oil was present in the film surfaces than in the over-all bulk of the composition. The analysis showed that the oil concentrates at the surface; and the outermost layer is substantially all drying oil. Immediately under this layer is a polyethylene-oil region, the thickness of which appears to depend upon the density of the polyethylene used. Physical removal of successive layers by abrasion showed a gradient of lesser oil content from the surface inward. Deeper within the body of the film, only polyethylene was found by infra-red analysis; although some drying oil, below the point of detection, may have been present.

This migration of the oil toward the surface appears to begin as the material leaves the extruder, and to continue for a period of time thereafter.

This unexpected existence of a concentration gradient in the polyolefin-drying oil blend, with the drying oil migrating toward the surface, is believed an explanation of the fact that such low concentrations of the drying oil in the over-all blended composition produce adhesion with conventional inks and coatings. Concentration as low as 0.05 percent of drying oil produces enhanced adhesion toward standard dried inks and coatings. In this manner, small amounts of a modifying drying oil may be added to the polyolefin substance while being milled and subsequently produce a film, sheet, container, etc., which exhibits an adhesion with standard dried inks and coatings without the customary surface treatment thereof and such effective modified compositions contain so small a percentage of the modifying drying oil that the desirable physical and chemical characteristics of the polyolefin composition itself are not harmfully affected thereby. More than 15 percent of the drying oil is not needed, by weight of the blend of polyolefin and drying oil.

The temperature at which the blends of polyolefin and drying oil are heated in air for the several practices hereof is inversely related to the time, the content of drying oil, and the history as set out for Example 1. The effect is that of causing drying of at least the portions of the drying oil molecules which are exposed at the surface.

The curing of the drying oil of the blend can be promoted by exposure to ultra-violet light. A blend of polyethylene with 2 percent by weight of tung oil, when baked in an air circulating oven for 10 minutes at 195 degrees F. gave ink adhesion ratings of "P" with an offset ink; whereas when a bank of six ultra-violet lamps, with the principal emission at 2537 angstroms, had their radiation directed against a like specimen in the same oven, values of "E" were obtained at like temperature and time: "P" designating "poor", and "E" designating "excellent" as set out for Example 1 above.

The ultra-violet lamps were tubular in shape, 11 inches long and 9/16 inch diameter: being mounted parallel in a plane about 4 inches from the film specimens, and equally spaced over a width of 10½ inches. Lamps commercially available under the General Electric Company Mark G8T5 were employed.

The polyethylenes of the above examples may be replaced by other polyethylenes, by polypropylene and by other non-polar polyhydrocarbons which of themselves do not adhere to such inks and coatings: wherewith blends thereof as taught herein serve to provide excellent adhesion effects.

Example 17

One thousand eight hundred grams of polypropylene, available commercially under the mark "Pro-fax" grade 6420F, were masticated in a commercial high-pressure steam heated Banbury mixer until the temperature reached 340° F., whereupon two hundred grams of tung oil were added in fifty gram increments over a five minute period. The mixing was continued for two additional minutes to assure homogeneity. A portion of the molten mass was placed in a steam heated rubber mill, removed from the rotating rolls as a film of approximately fifteen mils in thickness and, finally, cooled. One portion of the film was allowed to stand at room temperature for twenty-four hours. Another portion of the film was heated in air in an oven for thirty minutes at 195° F. A rotogravure ink (a), as described in Example 1, was applied to the oil-modified films and also to a film sample of the same but unmodified polypropylene. The inked samples were dried at 195° F. for fifteen minutes and evaluated by means of the standard pressure sensitive tape test as described in Example 1. The results indicated that the oil-modified film that had been air dried for 24 hours had a noticeably improved adhesion towards the ink: the modified film that had been air dried for thirty mintues at 195° F. had an adhesion rating of "Excellent." Unmodified polypropylene film that had been exposed to air at room temperature for twenty-four hours or to air at 195° F. for thirty minutes exhibited no adhesion towards the ink.

Example 18

One thousand grams of the molten oil-containing polypropylene mass of Example 17, above, was added to an additional one thousand grams of molten polypropylene in a Banbury mixer at 350° F. The mixture was masticated for two minutes, removed from the mixer, placed in a heated rubber mill, a film of ten to fifteen mils in thickness removed from the rotating rolls and, finally, cooled to room temperature. The film was then heated to 195° F. for thirty minutes in a circulating air oven, and cooled to room temperature. A standard rotogravure ink (a), as described in Example 1, was applied and dried for fifteen minutes at 195° F. An adhesion rating of "Excellent" was obtained by means of the standard pressure sensitive tape test.

Example 19

Procedures as in the foregoing examples were conducted with the so-called triglycerides of polyunsaturated fatty acids consisting of the group of linoleic, conjugated linoleic, linolenic, eleostearic and licanic acids, in place of the tung or chinawood oil. Like results were obtained.

Other preferred drying oils are dehydrated castor, oiticica, soya, safflower, and linseed oils; each of which when substituted for tung oil in the above Example 14 gives satisfactory results as is shown in the following table:

TABLE V

| Ex. | Oil | Film Drying Conditions | Ink Adhesion | |
|---|---|---|---|---|
| | | | (a) | (b) |
| 20 | Oiticica | 24 hours at 195° F | E | E |
| 21 | Soya | 24 hours at 195° F | E | E |
| 22 | D.C.O. | 3 days at 195° F | E | E |
| 23 | Linseed | 3 days at 195° F | E | E |
| 24 | None | 3 days at 195° F | None | None |

E = Excellent.

The procedure comprises admixing 0.05 to 15 percent of a drying oil with the non-polar polyolefin, the drying oil having at least 40 percent of its acid component consisting of polyunsaturated acids: and preparing from such blend the body to which the ink composition is to be applied, e.g., by extrusion. Air-drying is employed upon the body until its surface is non-tacky: that is, until the drying oil has hardened by oxidation and/or polymerization. The ink is then applied and dried as usual.

The specific examples are not restrictive, and the invention may be practiced in many ways within the scope of the appended claims.

What is claimed is:

1. The method of preparing a printed body containing a non-polar polyolefin, which comprises intimately blending the polyolefin with a drying oil, said drying oil having at least 40 percent of its total acid components in polyunsaturated form and being present as 0.05 to 15 percent by weight of the blend of polyolefin and drying oil, forming the body from the blend, effecting drying of the drying oil at the surface of the body until the surface is non-tacky, applying an ink deposit to the said surface, and drying the ink.

2. The method of claim 1, in which the drying oil is tung oil.

3. The method of claim 1, in which 0.005 to 3 percent of a metallic drier is incorporated in the blend, computed by weight of metal content of the drier relative to the weight of the drying oil.

4. The method of claim 1, in which the drying of the drying oil is effected by heating in air.

5. The method of claim 4, in which the said surface is exposed to ultra-violet radiation during the heating in air.

6. A printed article comprising a polyolefin base and an outer surface consisting essentially of a blend of non-polar polyolefins and 0.05 to 15% by weight of a drying oil having at least 40% of its total acid components in the form of polyunsaturates; said outer surface having printing ink adhering thereto.

7. The articles of claim 6 further characterized in that the non-polar polyolefin is polyethylene and the drying oil is tung oil.

8. The article of claim 6 further characterized in that a metal drier is present in the blend in an amount ranging from 0.005 to 5.0% by weight of the drying oil; said percentages being computed by the metal content of the drier.

9. The article of claim 8 further characterized in that the metal drier is cobalt napthenate.

References Cited by the Examiner

UNITED STATES PATENTS

| 2,411,767 | 11/1946 | Waldie et al. | 204—161 |
| 2,472,680 | 6/1949 | Pratt | 260—23 |
| 2,502,841 | 4/1950 | Henderson | 117—12 |
| 2,878,519 | 3/1959 | Wolinski | 204—162 |
| 3,051,591 | 8/1962 | Sites et al. | 204—161 |
| 3,109,746 | 11/1963 | Seedorf | 117—38 |
| 3,117,100 | 1/1964 | Cox et al. | 117—138.8 |

ALFRED L. LEAVITT, *Primary Examiner.*

RALPH S. KENDALL, *Examiner.*

A. H. ROSENSTEIN, *Assistant Examiner.*